United States Patent [19]
Haith et al.

[11] 3,789,136
[45] Jan. 29, 1974

[54] ELECTRONIC SYSTEM FOR VIEWER RESPONSE TO TELEVISION PROGRAM STIMULI

[76] Inventors: Marshall M. Haith, 2703 S. Macon, Aurora, Colo.; Robert A. Lentz, 138 Huron Ave., Cambridge, Mass. 02138

[22] Filed: June 28, 1972

[21] Appl. No.: 267,083

[52] U.S. Cl. ............... 178/5.8 R, 178/5.6, 35/9 R, 35/9 A, 35/9 E
[51] Int. Cl. .............................................. H04r 7/00
[58] Field of Search ........... 178/5.6, 5.8 R, DIG. 13, 178/DIG. 35; 340/324 A, 324 AD; 35/9 R, 9 A, 9 B, 9 E, 9 F

[56] References Cited
UNITED STATES PATENTS

| | | | |
|---|---|---|---|
| 3,546,791 | 12/1970 | Koos et al. ..................... | 178/5.6 X |
| 3,606,688 | 9/1971 | Zawels et al. .................. | 35/9 R |
| 3,256,386 | 6/1966 | Morchand ....................... | 178/5.6 |
| 3,382,588 | 5/1968 | Serrell et al. ................. | 178/DIG. 35 |
| 3,566,482 | 3/1971 | Morchand ....................... | 35/9 R |
| 3,654,708 | 4/1972 | Brudner ........................ | 35/9 A |

*Primary Examiner*—Robert L. Richardson
*Attorney, Agent, or Firm*—Joseph Weingarten et al.

[57] ABSTRACT

An electronic system for use with received educational television program material and operative to indicate the correct or incorrect nature of a viewer's response to presented visual stimuli, thereby creating a reinforcing and bilateral aspect to an educational television experience.

In a typical embodiment of the system a console is provided having a display panel divided into segments which are spatially arranged to correspond to similarly arranged segments of an associated television screen on which stimuli are displayed. Each segment of the display panel is manually actuable, and actuation of a segment representing a correct response to presented stimuli causes a suitable output indication of such correct response.

9 Claims, 6 Drawing Figures

ELECTRONIC SYSTEM FOR VIEWER RESPONSE TO TELEVISION PROGRAM STIMULI

FIELD OF THE INVENTION

This invention relates generally to electronic communication systems and more particularly to a system especially suitable for educational television for providing viewer responses to stimuli presented on a television screen.

BACKGROUND OF THE INVENTION

There has evolved in recent years a vast improvement in the methods and efficiency of mass communication. The number of television receivers, for instance, has proliferated to the point where nearly everyone has access to one. Similarly, many advancements have been made in the field of education, one such advance being the use of mass communication methods, particularly television, for purposes of education. For example, pre-school children's broadcasts, and broadcasts of lessons in foreign languages are well known utilizations of television for education. Videotaped and closed circuit programs, furthermore, are used for a great variety of educational purposes from the pre-school level through the graduate school level. The advantages of such educational techniques are obvious — they can reach a vast number of people, including the infirm, the pre-school and those with special education problems; therefore, they will afford greater numbers of people access to educational methods, ideas and material.

However, as much as the instructional potential of television makes itself evident, it has not been fully realized. This is in part due to the unilateral nature of educational broadcasting, as a recipient of audio-visual program material has no opportunity to interact with such material, affording him no opportunity to determine the effect of the material on himself. The educational process becomes eminently more successful when an individual is given a feedback to his response to educational material, particularly with respect to questions and answers concerning the material. There is a necessity, therefore, that there be a feedback from the individual to the source of his educational material to provide a bilateral educational situation.

The invention is particularly suitable for use with children of pre-school age. It is already well known that children's broadcasts such as the program "Sesame Street" can achieve a marked degree of educational success and popularity. The educational potential of such programs, however, is limited at this time because the instructional methodology is unilateral and relies principally on repetition and poetic or visual device. The present invention provides the means to immediately reinforce a child's learning pattern in his response to program material, with the result that the learning process becomes more expeditious and successful.

SUMMARY OF THE INVENTION

In accordance with the present invention, an electronic console is employed in association with a television receiver or monitor and having a display panel divided into segments corresponding in spatial relation to similar segments of a television screen on which stimuli are presented for viewer response. A switch or other suitable mechanism is cooperative with each segment and is manually actuable by the viewer to indicate the viewer's response to presented stimuli.

A uniquely coded pilot signal is transmitted in conjunction with television program material and identifies a particular segment of the television screen upon which stimuli are displayed for response by a viewer. The pilot signals are detected by electronic circuitry in the console and employed to denote a correct response choice. Selection of a particular segment of the display panel by the viewer causes the production of a signal identifying the selected segment, and this segment signal in conjunction with the received pilot signal for the selected segment causes an output indication of an intended response, such as by illumination of the selected panel segment. The presence of a pilot signal or a segment signal alone for a particular panel segment will not cause an output indication of correct response.

In practice, the invention is especially adapted for use with pre-school children, so that they may more fully participate in an educational television show aimed at their level. A multiplicity of answers to a question regarding the subject material will be displayed, usually pictorially, on a television screen in a predetermined spatial arrangement. For instance, the screen can be divided into quadrants with a possible answer in each quadrant. A child or other viewer in response to a question presented, will choose one of the answers displayed on a television screen, and will select that segment of the console display panel which spatially corresponds to the segment of the television screen containing his answer. Selection is usually accomplished by touching the intended panel segment representing the selected answer. If the viewer has correctly answered the question presented, the console circuitry upon coordinate detection of a pilot signal and a segment signal for a "correct" segment will cause illumination or other output indication of the selected segment of the console panel to denote a correct viewer response. An output indication of an "incorrect" response can also be provided on the console.

DESCRIPTION OF THE DRAWINGS

The invention will be more fully understood from the following detailed description taken in conjunction with the accompanying drawings, in which.

DETAILED DESCRIPTION OF THE INVENTION

Figure 1:
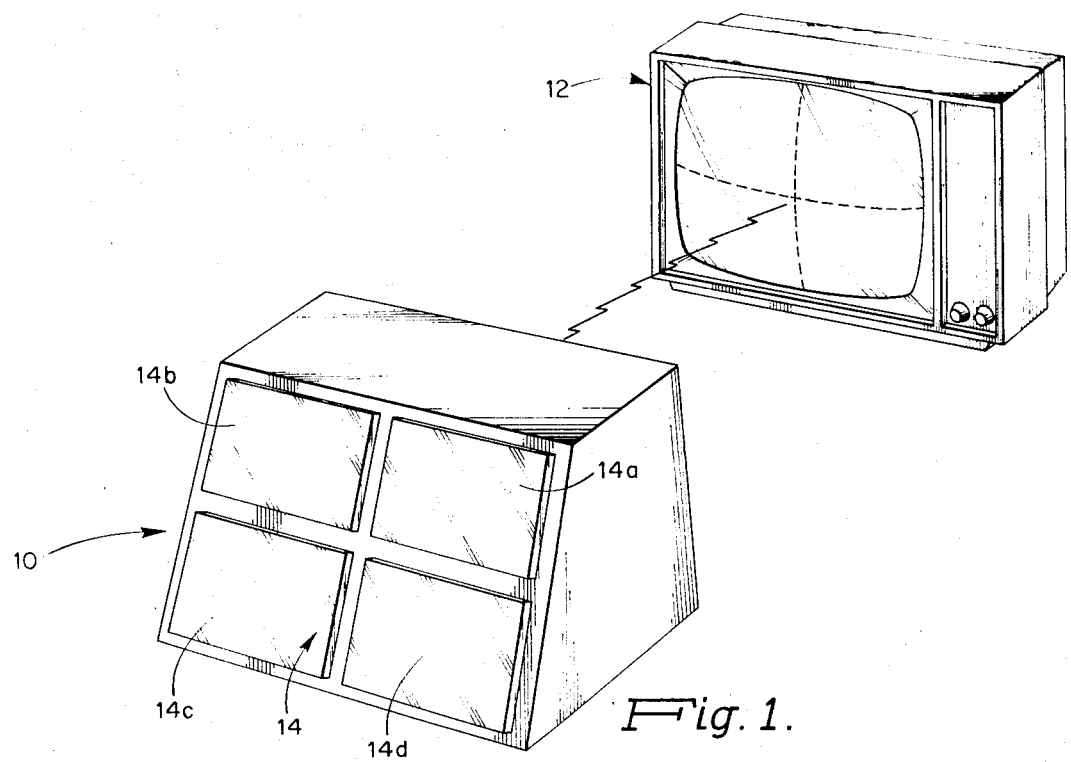
FIG. 1 is a pictorial view of an electronic console embodying the invention and employed in association with a television receiver.

The invention in typical implementation is depicted in FIG. 1 and includes an electronic console 10 employed in association with a television receiver 12 which can be a standard commercial broadcast receiver for use with broadcast or cable television programming, or a television monitor for use with closed circuit or taped program material. The console 10 includes a display panel 14 divided into segments 14a–14d in a spatial arrangement conforming to an arrangement on the television screen on which stimuli are to be presented for response by a viewer. By way of example, four display segments 14a–14d are shown in a quadrant relationship. Each segment 14 is manually actuable by means associated with the respective segments, and typically each segment includes a switch mechanism actuable upon touching of the front surface thereof. Switch actuation is employed to provide a signal identifying a selected segment of the display screen to denote a response choice to stimuli presented on the television screen. Means are also provided for each segment of the display screen to indicate the selection of an intended segment, and usually such indication is by illumination of the correct selected segment. In the illustrated embodiment, the display panel 14 is of translucent material having a suitable light source such as a lamp disposed therebehind for illumination of a particular panel segment in response to predetermined system conditions as will be described.

Figure 2:
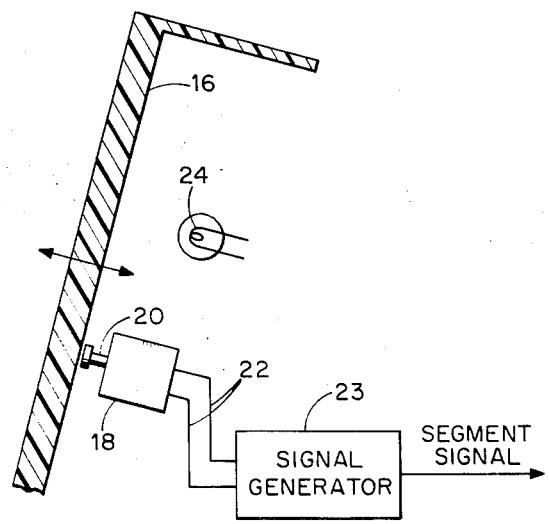
FIG. 2 is a diagrammatic representation of segment actuating and segment indicating apparatus employed in the embodiment of FIG. 1.

Referring to FIG. 2, there is shown a portion 16 of a panel segment supported for movement along an axis transverse to the plane of the panel as indicated by the double headed arrow. An electrical switch 18 is provided having an actuating arm 20 disposed in association with the back surface of segment 16 and actuable by slight movement in a rearward direction of the panel segment to cause movement of arm 20 and consequent actuation of switch 18. The electrical leads 22 of switch 18 are coupled to a signal generating circuit 23 which provides a segment signal to the system logic to be described. An illumination source, such as a lamp 24, is disposed adjacent the rear surface of panel segment 16 and is operative to illuminate the segment under predetermined conditions to indicate an intended viewer response to presented stimuli.

It will be appreciated that manual selection of a panel segment can be accomplished by various means. In addition to the manually actuable switch described above, other switch mechanisms can also be employed with equal effect. For example, switches which are thermally or capacitively actuated and which are per se well known can be employed in association with the segments of the display panel such that touching by the viewer's finger or hand or a selected segment will cause switch actuation. In some instances it may be desirable to employ a switch disposed adjacent each panel segment and directly actuable rather than via a panel segment.

Figure 3:
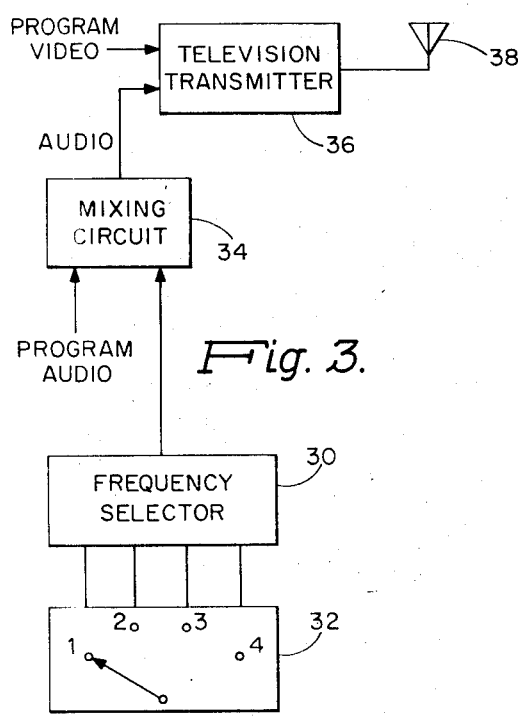
FIG. 3 is a block diagram representation of pilot signal transmission circuitry embodied in the invention.

In order to identify the intended stimuli to be responded to by a viewer, one or more pilot signals are provided with the televised program material to identify the segment or segments of the television screen on which the intended stimuli are presented. For broadcast program material the pilot signals can be provided as shown in FIG. 3. A frequency selector 30 which includes a selector switch 32 is provided to manually select one of a plurality of frequencies to identify a particular screen segment. The pilot signal which is in the audio frequency range is mixed with the program audio signals by a mixing circuit 34. The output audio signals from mixing circuit 34 are applied to a television transmitter 36 which also receives video signals from a video source which may be a television camera or video recorder.

The composite television signal is transmitted by antenna 38 and is received in the usual manner by a television receiving antenna coupled to a television receiver. Audio and video program information is presented in conventional fashion by the television receiver, and in addition, the pilot signal transmitted along with the program material is reproduced by the loudspeaker of the television receiver. The reproduced pilot signal is received by the console (FIG. 1) and is employed in association with the segment signal of a selected display screen segment to indicate whether or not an intended response is made by the viewer to presented stimuli. The pilot signal can, as an alternative, take the form of an audio subcarrier such as a 3 KHz burst frequency modulated in accordance with the selected frequency to identify a particular screen segment. As another alternative, the pilot signal can be combined as a subcarrier with the program video and radiated at radio frequencies from the television receiver such as from the video amplifier for detection by console 10.

It will be appreciated that the invention is also usable with cable television programming, in which case the pilot signals are conveyed along with the program material over a cable connected to receiver 12. The invention can also be employed with closed circuit program material. In this case the program source, typically a video tape, is directly connected to the receiver 12 from which pilot signals are directed to the associated console 10. The pilot signals can be provided as in the embodiment of FIG. 3 except that a video recorder is employed in place of transmitter 36. For live programming, pilot signals can be provided in association with program video from a television camera connected to receiver 12.

Figure 4:
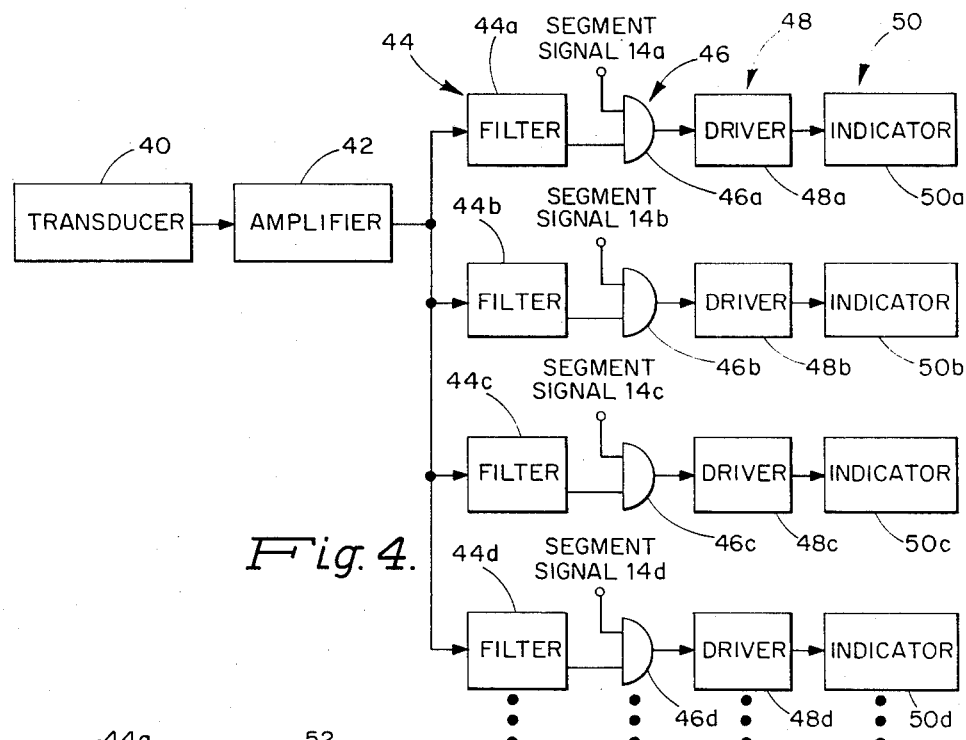
FIG. 4 is a block diagram representation of electronic console logic circuitry according to the invention.

The console circuitry is depicted in FIG. 4 and includes a transducer 40 for detecting the pilot signal reproduced by the television receiver. The transducer includes a microphone for receipt of transmitted audio pilot signals, and in the event that the pilot signal is in the form of an audio subcarrier, also includes a subcarrier detector which is itself well known in the art. In the event that a radio frequency pilot signal is employed, the transducer includes an antenna and RF detector, also per se well known. The output signals provided by transducer 40 are amplified by amplifier 42 and applied to a plurality of filters 44 each corresponding to a screen segment on which stimuli are presented for viewer response. In the illustrated embodiment, four filters 44a–44d are shown each responsive to a respective pilot signal frequency identifying a respective screen segment. Thus, each filter 44 is operative to provide an output signal in response to a pilot signal of respective frequency.

The output signal of each filter 44 is applied to one input of an AND gate 46, the other input of which is a segment signal from the switch and signal generator associated with respective display screen segments. The signal from segment 14a is applied to AND gate 46a, the signal from segment 14b is applied to gate 46b, while the signals from segments 14c and 14d are applied respectively to gates 46c and 46d. The output of each AND gate 46 is applied to a respective driver circuit 48, the output of which, in turn, is coupled to respective indicators 50 associated with corresponding display screen segments 14. The indicators are the lamps 24 in the illustrated embodiment.

In operation, the receipt by transducer 40 of a pilot signal of predetermined frequency identifying a particular television screen segment containing a stimulus for viewer response causes the signal to be applied to filters 44. Only the filter corresponding to the particular pilot signal frequency provides an output signal to the associated AND gate 46. If the viewer has manually selected the intended display segment 14 corresponding to the television screen segment containing the intended stimulus to be responded to, then selection of the intended segment 14 causes a segment signal to be provided, by the associated segment switch 18 and signal generator 23, to the AND gate 46 associated with the selected segment. The presence of both the segment signal and pilot signal for the intended segment causes an output signal to be provided by the corresponding AND gate to the corresponding driver 48 for actuation of the indicator 50 associated with the selected display segment.

The selected display screen segment thus becomes illuminated to indicate a correct viewer response to presented stimuli. Selection by a viewer of a panel segment signal of the selected segment will be applied to an AND gate other than the gate receiving the pilot signal identifying the correct display segment. In some instances more than one response may be provided for presented stimuli, in which case pilot signals are received identifying the several intended display screen segments which can be correctly selected by the viewer.

Illumination of a selected panel segment can be momentary, for a period specified by the coincidence of the pilot signal and segment signal for the selected panel segment, or the illumination can be for a longer duration by use of appropriate latching circuitry. For example, the signal generator 23 associated with each segment switch 18 can be operative to provide a segment signal for a predetermined duration of time in response to switch actuation, or can provide a latched segment signal which remains present until the signal generating circuit 23 is reset.

Figure 5:
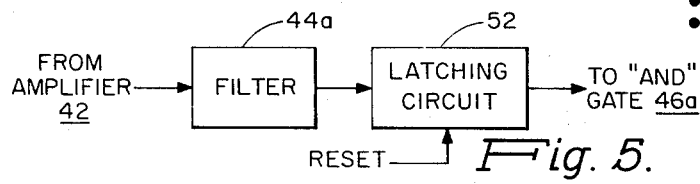
FIG. 5 is a block diagram representation of an alternative embodiment of the logic circuitry of FIG. 4.

Latching circuitry can also be provided as shown in FIG. 5. A latching circuit 52 is provided between each filter 44 and associated AND gate 46 in the circuitry of FIG. 4, in FIG. 5, a latching circuit 52 being shown between filter 44a and AND gate 46a. In response to a pilot signal detected by filter 44a, the latching circuit 52 provides an output signal to an input of AND gate 46a which remains present until the circuit is reset. Such resetting can be accomplished automatically after a predetermined duration or upon the occurrence of a reset signal such as from a reset control. A latching circuit can alternatively be provided between the AND gate 46 and driver 48 of each channel of the FIG. 4 circuitry and operative upon receipt of an output signal from the associated AND gate. In this event a signal for energizing a panel segment indicator 50 remains on for a relatively long duration even though the pilot signal and/or segment signal is of relatively short duration.

Figure 6:
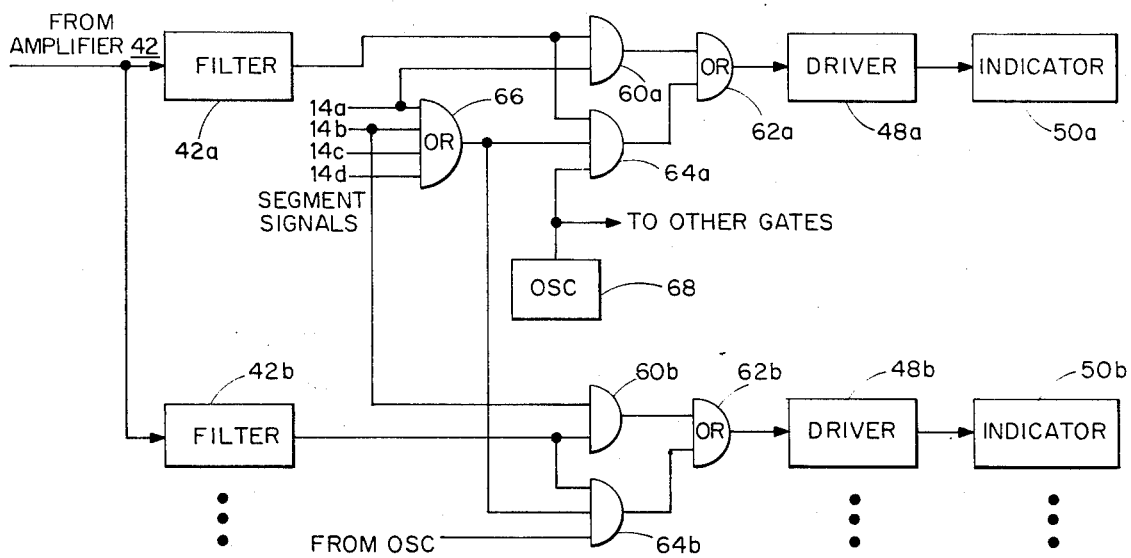
FIG. 6 is a block diagram representation of a further alternative embodiment of logic circuitry according to the invention.

In the embodiment described above, a display segment becomes illuminated only upon selection of a correct or intended viewer response. In order to provide further interaction of a viewer with the program material being presented it is often useful to provide a visual indication of all responses and whether or not a correct response is made. In the embodiment of FIG. 6 selection of any display segment 14 by a viewer will cause illumination of the selected segment, while selection of an intended segment will cause a distinguishable illumination pattern such as a flashing light.

Referring now to FIG. 6, filters 42a and 42b are depicted and are operative as in the embodiment of FIG. 4 to detect respective pilot signals identifying particular screen segments. Only two filters are shown, it being understood that additional filters are provided as in the above embodiment for the other screen segments. The drivers 48a, 48b and associated indicators 50a and 50b are as described above. The output of filter 42a is applied to an input of an AND gate 60a, the other input of which is the segment signal from segment 14a. The output of AND gate 60a is applied to one input of an OR gate 62a the output of which is applied to driver 48a. The output of filter 42a is also applied to an input of an AND gate 64a, the output of which is applied to the other input of OR gate 62a. A second input is provided to AND gate 64a by an OR gate 66 which receives as inputs the segment signals from the display segments 14a–14d. An oscillator 68 provides a variable amplitude signal to an input of AND gate 64a and provides this signal similarly to other corresponding AND gates of the circuitry. Filter 42b is similarly connected to associated gates 60b, 62b and 64b. In this case, however, AND gate 60b receives an input from the segment signal of segment 14b. Similarly, the other segment signals are applied to respective gating circuitry associated with the other filters of the overall logic.

To illustrate the operation of the logic of FIG. 6, assume that a pilot signal identifying segment 14a is detected by filters 42a and the viewer has selected segment 14a, indicating a correct response. Filter 42a provides a signal to AND gate 60a which also receives a segment signal from segment 14a. The AND gate 60a thus provides an output signal via OR gate 62a to driver 48a for energization of indicator 50a associated with the selected display segment 14. If, however, a viewer selected another segment, say segment 14b, while segment 14a remained the correct response, AND gate 60a would provide no output signal. The segment signal from segment 14b is applied via OR gate 66 to an input of AND gate 64a which also receives an input signal from oscillator 68. AND gate 64a provides a varying amplitude signal to OR gate 62a and thence to driver 48a for pulsating energization of indicator 50a.

As a result, if an incorrect segment of the display screen is selected, a segment signal from the selected segment will be applied to OR gate 66 which will provide an output signal to AND gate 64a which also receives the pilot signal from filter 42a and the oscillator signal from oscillator 68. The AND gate 64a thus provides a pulsating output signal to OR gate 62a and thence to the driver 48a. The indicator 50a is thereby energized in a pulsating manner to cause flashing of the correct display segment which should be chosen by the viewer. The logic can also be implemented to provide other output indications of correct or incorrect answer choices, such as by flashing and nonflashing lights, lights of different color or by combined visual and aural output indications.

The invention is not limited to use in an educational environment alone, but is equally well suited to use in television entertainment such as in game and quiz show playing. A television viewer is able by use of the invention to play along with a broadcast television game or quiz show or a closed circuit show originating on prerecorded video tape.

The logic circuitry of the invention is readily implemented by well known circuit techniques and can be of microcircuit form to be contained within a small and readily portable console. The console can be, for example, sufficiently small for a viewer to hold in his lap while responding to televised program material. It will be appreciated that the invention can be embodied in many different structural and circuit configurations to suit particular performance requirements. Accordingly, it is not intended to limit the invention by what has been particularly shown and described except as indicated in the appended claims.

What is claimed is:

1. For use with a television receiver on the screen of which televised program material is presented in the form of stimuli, where said screen is divided into segments each containing a stimulus, and a wireless pilot signal is propagated by said television receiver of a selected frequency identifying the screen segment containing a stimulus for viewer response; a system for selecting one of said stimuli, said system comprising:
   a console having a display screen thereon divided into a plurality of segments, said segments corresponding in spatial relation to the segments of said television screen on which said stimuli are presented;
   manually actuable means associated with each segment of said display screen and operative to provide a respective signal indication in said console for each one of said display screen segments selected by a viewer, said selected display screen segments corresponding to stimuli presented on spatially related segments of said television screen;
   transducer means in said console for detecting said wireless pilot signal propagated by said television receiver and identifying a screen segment containing a stimulus for viewer response and for providing an electrical signal in said console in response to said received wireless pilot signal;
   logic means in said console coupled to said manually actuable means and said transducer means and operative in response to said electrical signal and said signal indication for the corresponding display screen segment selected by the viewer to provide an output signal representative of an intended viewer response to a presented stimulus said logic circuitry including a plurality of filters each corresponding to a screen segment on which stimuli are presented for viewer response and each operative to provide an output signal in response to a pilot signal of respective frequency; and
   a plurality of gates each operative to receive the output signal from a respective one of said filters and operative to receive a respective signal indication from said manually actuable means and to provide an output signal only in response to the presence of both received signals; and
   means operative in response to said gate output signal for providing an output indication of said intended response.

2. The invention according to claim 1 wherein said console includes a display screen of translucent material, each of said display screen segments being coupled to a respective manually actuable means and actuable upon a manual force applied to said segment.

3. The invention according to claim 2 wherein said means operative in response to said output signal includes a plurality of illumination sources each associated with a respective one of said console display screen segments and each operative to cause illumination of the display screen segment corresponding to an intended viewer response.

4. The invention according to claim 1 wherein said wireless pilot signal is in the form of an audio signal propagated by said television receiver and wherein said transducer means includes a microphone for receiving said audio signal and providing an electrical signal representation thereof.

5. The invention according to claim 1 wherein said wireless pilot signal is in the form of an audio subcarrier propagated by said television receiver and modulated in accordance with the selected frequency identifying a particular screen segment and wherein said transducer means includes a subcarrier detector for detection of said audio subcarrier and provision of an electrical signal representation thereof.

6. The invention according to claim 1 wherein said wireless pilot signal is provided in the form of a radio frequency signal radiated from said television receiver and wherein said transducer means includes an antenna and an RF detector.

7. The invention according to claim 1 wherein said logic circuitry further includes:
   a plurality of latching circuits each associated with a respective one of said filters and each operative in response to a signal from a respective filter to provide an input signal to a respective one of said gates which remains present until said latching circuit is reset.

8. A system for viewer response to television program stimuli comprising:
   a television receiver having a viewing screen on which program material is presented;
   means for providing televised program material in the form of stimuli presented on respective segments of the television screen;
   means for providing a frequency coded pilot signal along with said program material for wireless propagation by said television receiver and of a predetermined frequency identifying the screen segment containing a stimulus for viewer response;
   a console in operative association with said television receiver and having a display screen thereon divided into a plurality of segments corresponding in spatial relation to the segments of said television screen on which said stimuli are presented;
   manually actuable means associated with each segment of said display screen and operative to provide a respective signal indication for each one of said display screen segments selected by a viewer, said selected display screen segments corresponding to stimuli presented on the spatially related segments of said television screen;
   means for detecting said wireless pilot signal propagated by said television receiver and identifying a screen segment containing a stimulus for viewer response, said detecting means including a transducer for providing an electrical signal in response to said received wireless pilot signal;

logic circuitry coupled to said manually actuable means and said pilot signal detection means and operative in response to said electrical signal and said signal indication for the corresponding display screen segment selected by the viewer to provide an output signal representative of an intended viewer response to a presented stimulus said logic circuitry including a plurality of filters each corresponding to a screen segment on which stimuli are presented for viewer response and each operative to provide an output signal in response to a pilot signal of respective frequency; and means associated with each segment of said console display screen for providing in response to said gate output signal an output indication of said intended response.

9. For use with a television receiver on the screen of which televised program material is presented in the form of a plurality of stimuli each on a respective segment of said screen, and a wireless pilot signal is propagated by said television receiver identifying the screen segment containing a stimulus for viewer response; a system for selecting one of said stimuli, said system comprising:

a console having a display screen thereon divided into a plurality of segments, said segments corresponding in spatial relation to the segments of said television screen on which said stimuli are presented;

manually actuable means associated with each segment of said display screen and operative to provide a respective signal indication in said console for each one of said display screen segments selected by a viewer, said selected display screen segments corresponding to stimuli presented on spatially related segments of said television screen;

transducer means for detecting said wireless pilot signal propagated by said television receiver and identifying a screen segment containing a stimulus for viewer response and for providing an electrical signal in said console in response to said received wireless pilot signal;

means operative to provide an output indication on said console of correct viewer response to said stimuli;

logic means in said console coupled to said manually actuable means and said transducer means and operative in response to said electrical signal and said signal indication for the corresponding display screen segment selected by the viewer to provide an output signal representative of an intended viewer response to a presented stimulus, said logic circuitry including a plurality of filters operative to receive said electrical signal and each operative in response to an electrical signal of respective frequency to provide an output signal;

a plurality of first gates each associated with a respective filter and each operative to receive a respective output signal from said respective filter and a respective one of said signal indications from said manually actuable means and to provide an output signal upon the presence of both input signals;

means for providing a variable amplitude signal;

means for coupling said variable amplitude signal to each of said first gates; and second gating means operative in the event of an incorrect viewer response to apply said variable amplitude signal to said output indication means to cause a different output indication of said incorrect response.

* * * * *